United States Patent [19]

Maurer et al.

[11] Patent Number: 4,515,632
[45] Date of Patent: May 7, 1985

[54] ACTIVATED AMMONIUM POLYPHOSPHATE, A PROCESS FOR MAKING IT, AND ITS USE

[75] Inventors: Alexander Maurer, Hürth; Horst Staendeke, Lohmar, both of Fed. Rep. of Germany

[73] Assignee: Hoechst Aktiengesellschaft, Fed. Rep. of Germany

[21] Appl. No.: 538,131

[22] Filed: Oct. 3, 1983

[30] Foreign Application Priority Data

Oct. 16, 1982 [DE] Fed. Rep. of Germany ....... 3238443

[51] Int. Cl.$^3$ ................................................ C09D 5/18
[52] U.S. Cl. .................................. 106/18.16; 252/602; 252/606; 423/305; 423/315
[58] Field of Search ................ 423/315, 305; 252/602, 252/606, 62; 106/18.16

[56] References Cited

U.S. PATENT DOCUMENTS

| | | | |
|---|---|---|---|
| 3,513,114 | 5/1970 | Hahn et al. | 252/606 X |
| 3,562,197 | 2/1971 | Sears et al. | 252/606 X |
| 3,654,190 | 4/1972 | Levine | 252/606 |
| 3,723,074 | 3/1973 | Sears et al. | 423/305 X |
| 3,926,990 | 12/1975 | Fukuba et al. | 544/195 |
| 3,939,107 | 2/1976 | Brown | 524/127 |
| 3,955,987 | 5/1976 | Schaar et al. | 106/18.15 |
| 4,009,137 | 2/1977 | Dany et al. | 523/179 |
| 4,010,137 | 3/1977 | Brady | 524/100 |
| 4,017,589 | 4/1977 | McCullough et al. | 423/315 |
| 4,123,575 | 10/1978 | Wesch et al. | 427/386 |
| 4,198,328 | 4/1980 | Bertelli et al. | 106/18.15 |
| 4,230,616 | 10/1980 | Godfried | 524/121 |
| 4,265,806 | 5/1981 | Grundmann et al. | 252/606 X |
| 4,312,805 | 1/1982 | Bertelli et al. | 524/100 |
| 4,396,586 | 8/1983 | Maurer et al. | 423/305 |

*Primary Examiner*—G. L. Kaplan
*Assistant Examiner*—Nam X. Nguyen
*Attorney, Agent, or Firm*—Connolly and Hutz

[57] ABSTRACT

The disclosure provides activated ammonium polyphosphate undergoing decomposition at an increased rate at temperatures within the range 300° to 600° C., the ammonium polyphosphate having been obtained by reacting it with melamine and/or dicyandiamide or their derivatives at 100° to 200° C.

5 Claims, No Drawings

ACTIVATED AMMONIUM POLYPHOSPHATE, A PROCESS FOR MAKING IT, AND ITS USE

By reason of its low solubility in water and its behaviour at higher temperatures, ammonium polyphosphate, briefly termed APP hereinafter, finds widespread uses as a constituent of coating compositions forming heat insulating layers. Typical of APP is its property under the action of heat to split off gaseous substances, e.g. ammonia, and together with carbonizing organic substances to form at the same time a protective layer of carbon and condensed phosphoric acid which prevents the direct access of heat to the combustible material to be protected.

As disclosed in European Patent Application No. 0 003 772, such coating composition may be composed of:
(a) 15 to 40 weight % of a phenol resin which may be heat-reactive in the presence of an aldehyde-donating compound,
(b) 25 to 45 weight % of an ammonium salt,
(c) 10 to 20 weight % of a carbohydrate and/or a polyhydric alcohol,
(d) 15 to 40 weight % of a heat-decomposable organic nitrogen compound and, if desired,
(e) a binder selected from the group consisting of water-soluble or solvent-soluble or water-dispersible vinyl polymers and, if desired,
(f) water and/or organic solvent which is (are) used in a quantity sufficient for components (a) through (e) to remain practically solid or applicable by means of a brush or smoother.

The efficiency of compositions forming heat-insulating coatings or layers is basically a result of their property under the action of elevated temperatures, e.g. in the event of a fire-outbreak, to foam and form a finely cellular carbon foam producing a heat insulating effect which protects the coated material, such as steel, wood or the like. In this case, the coating composition undergoes the following reactions.
1. The ammonium salt as a dehydrating agent, e.g. ammonium polyphosphate, undergoes decomposition at increased temperature while liberating an acid and ammonia.
2. The acid so liberated undergoes reaction with the hydroxyl groups of the carbohydrate or polyhydric alcohol while forming a thermally instable ester.
3. During the thermal decomposition of the ester carbon, water and $CO_2$ are being formed. By the simultaneous decomposition of the heat-decomposable organic nitrogen compound, such as melamine or dicyandiamide, additional non-combustible gases forming a carbon foam from the carbonaceous decomposition products of the ester are set free. The acid set free during the thermal decomposition of the ester reacts once again with the hydroxyl groups of the polyhydric alcohol, in the manner described under item 2 above.

As taught in German Patent Specification DE-AS No. 23 59 699, ammonium polyphosphates of the general formula

$$H_{(n-m)+2}(NH_4)_m P_n O_{3n+1}$$

in which n stands for a whole number with an average value of at least 20, m/n is at least about 0.7, and m stands for at most n+2, are especially suited for use as ammonium salt components.

To be suitable for use in compositions forming heat-insulating coatings, it is necessary for these compounds to combine in themselves low solubility in water with the property of liberating the acid as rapidly as possible at temperatures above their decomposition temperature while splitting off ammonia; in other words, it is highly desirable for them to undergo decomposition at a maximum rate.

We have now found that the decomposition rate above decomposition temperature of ammonium polyphosphates can be improved, i.e. activated, with the aid of certain addends leaving the ammonium polyphosphates' other properties unaffected.

The present invention now provides activated ammonium polyphosphate having an improved decomposition rate at temperatures within the range 300° to 600° C., the ammonium polyphosphate having been obtained by reacting it with melamine and/or dicyandiamide or their derivatives at temperatures of 100° to 200° C.

The invention also provides a process for making activated ammonium polyphosphate which comprises: reacting ammonium polyphosphate with a mean chain length of about 100 to 1000 with an activator consisting of melamine and/or dicyandiamide or their derivatives being thermally stable up to a temperature of about 220° C., the reaction being effected with continuous thorough mixing at a temperature of about 100° to 200° C. and over a period of about 10 minutes to 2 hours, and cooling the resulting product.

A preferred feature of the present process provides for the ammonium polyphosphate to have a mean chain length of 200 to 800.

A further preferred feature provides for the ammonium polyphosphate to be treated with the activator at a temperature of 150° to 200° C. and for the latter to be used in a proportion of 1 to 5 weight %.

The following statements are intended further to illustrate the process of this invention.

The activator should conveniently be added to the ammonium polyphosphate inside a mixing unit, e.g. a kneader, rotating tube or fluidized bed reactor. It can be added to ammonium polyphosphate made earlier or made immediately prior to the activator addition. During the treatment of the ammonium polyphosphate with the activator, this latter becomes superficially fixed to the acid groups of the APP. As a result, only minor quantities of activator are required to be used. These minor activator quantities do not adversely affect the APP's properties so desirable for the user, except that the decomposition rate within the temperature range of 300° to 600° C. is increased as targeted. The activators used in accordance with this invention have the advantage of forming no undesirable decomposition products during the thermal decomposition of APP. The fixation of the activator to the surface of APP is e.g. recognizable by the fact that the water-soluble proportions of the activated APP are not increased despite the addition of the activator.

For testing the behaviour of activated APP during its thermal decomposition, the product is placed in a thermobalance, subjected at a constant heating rate to thermal stress, and the occurring loss in weight is metered as an index of the quantity of acid liberated. The activated APP is found to undergo decomposition at a higher rate than unactivated APP.

The ammonium polyphosphates made by the process of this invention are highly suitable for use as constituents of compositions forming heat-insulating layers or coatings.

The following Examples illustrate the invention which is naturally not limited thereto.

EXAMPLE 1

5 kg ammonium polyphosphate I with a mean chain length n=500 was placed in a kneader with a capacity of 10 liters, heated to 150° C. and 140 g fine particulate melamine was added. Next, the whole was thoroughly mixed over a period of 30 minutes while the temperature was maintained at 150° C. An activated ammonium polyphosphate A with the properties indicated in Table 1 was obtained.

EXAMPLE 2

The procedure was as in Example 1 but the ammonium polyphosphate I was heated to 200° C. and the mixing period and cooling phase to 150° C. were 1 hour. A product B with the properties indicated in Table 1 was obtained.

EXAMPLE 3

The procedure was as in Example 1 but 50 g dicyandiamide was used as the activator. A product C with the properties indicated in Table 1 was obtained.

EXAMPLE 4

(Comparative Example)

As described in Example 1 of German Patent Specification DE-OS No. 30 38 836, $(NH_4)_2PO_4$, $P_2O_5$ and ammonia were reacted to give ammonium polyphosphate. The feed mixture was admixed with 5 weight % melamine, based on $P_2O_5$. After the reaction was terminated, a product D with the properties indicated in Table 1 was obtained.

EXAMPLE 5

(Comparative Example)

As described in German Patent Specification DE-PS No. 23 30 174, Example 1, ammonium polyphosphate was made from $(NH_4)_2HPO_4$, $P_4O_{10}$ and $NH_3$ at a temperature of 265° C. A product E with the properties indicated in Table 1 was obtained.

EXAMPLE 6

5 kg APP II with a mean chain length of 270 was reacted with 250 g fine particulate melamine with thorough agitation, at a temperature of 200° C. over a period of 1 hour. After cooling a product F with the properties indicated in Table II was obtained. Table II also indicates the decomposition rates of the respective feed materials, metered under identical conditions.

EXAMPLE 7

The procedure was as in Example 6 but only 50 g melamine was used. A product G with the properties indicated in Table II was obtained.

EXAMPLE 8

This Example illustrates the incendiary behaviour of a coating composition forming a heat-insulating layer, the coating composition containing an ammonium polyphosphate activated in accordance with this invention.

(a) Preparation of coating composition: The following materials were successively introduced into a vessel provided with an agitator and dissolver disc:
- 250 g water.
- 30 g 10% aqueous CALGON-N solution (this is a registered Trade Mark of Messrs J. A. Benckiser GmbH, Ludwigshafen/Rhein, Federal Republic of Germany)
- 100 g 3% aqueous solution of carboxymethylcellulose
- 560 g activated ammonium polyphosphate of Example 6
- 110 g dicyandiamide
- 310 g melamine
- 310 g pentaerythritol
- 120 g titanium dioxide
- 660 g MOWILITH DC 20 F (this is a registered Trade Mark of Hoechst Aktiengesellschaft, Frankfurt/Main, Federal Republic of Germany)
- 550 g chlorinated paraffin 50, liquid (this is a commercial product of Hoechst Aktiengesellschaft, Frankfurt/Main, Federal Republic of Germany)
- 220 g water.

The intumescent coating composition had a viscosity of 52 Pa.s, measured at 25° C.

(b) Dry spruce wood coated with the coating composition just described was subjected to a fire shaft test. More specifically, 506 g/m² coating composition was applied twice to dry spruce wood with the dimensions of 100×19×2 cm.

The spruce wood so coated was subjected to fire shaft test DIN 4102-B 1 (DIN stands for German Industrial Standard) and a maximum smoke temperature of 118° C. was metered; the average unburnt residual length was 36 cm; regarded as residual length was that portion of the specimen which neither at its surface nor in its interior was burnt or coked. This was in compliance with the requirements of burning class DIN 4102-B 1.

The foam height and foam structure were also evaluated after the fire shaft test.

The foam height was 12 mm and the foam structure was finely cellular, solid and free from cracks.

TABLE 1

| Product | APP I | A | B | C | D | E |
|---|---|---|---|---|---|---|
| Decomposition temperature in °C. | 285 | 285 | 275 | 265 | 280 | 265 |
| Decomposition rate at | | | | | | |
| 350° C. | 2.7 | 4.1 | 4.4 | 5.0 | 3.0 | 3.2 |
| 400° C. | 6.6 | 12.6 | 12.7 | 10.7 | 6.7 | 7.4 |
| 500° C. | 12.7 | 17.9 | 18.5 | 16.5 | 13.1 | 13.6 |
| 600° C. | 18.4 | 27.8 | 28.8 | 25.8 | 19.2 | 19.8 |
| Water-soluble matter (mass %) | 7 | 7 | 5 | 7 | 10 | 19 |
| pH-value | 4.6 | 7.7 | 7.8 | 4.6 | 5.7 | 5.6 |
| Viscosity in | | | | | | |
| Water (mPa.s) | 26 | 22 | 13 | 25 | 28 | 270 |
| DESMOPHEN 2200* (Pa.s) | 44 | 49 | 48 | 44 | 42 | 68 |
| Proportion of APP II in % | >90 | >90 | >90 | >90 | >90 | 75 |

*DESMOPHEN 2200 is a polyesterpolyol and a registered Trade Mark of Bayer Aktiengesellschaft, Leverkusen, Federal Republic of Germany.

TABLE 2

| Product | APP II | F | G | Mel* | DCDA* |
|---|---|---|---|---|---|
| Decomposition temperature in °C. | 286. | 280 | 265 | 248 | 224 |
| Decomposition | | | | | |

TABLE 2-continued

| Product rate in % at | APP II | F | G | Mel* | DCDA* |
|---|---|---|---|---|---|
| 300° C. | 0.3 | 1.6 | 0.4 | 3.4 | 9.3 |
| 350° C. | 3.8 | 5.4 | 4.0 | 33.6 | 26.8 |
| 400° C. | 7.9 | 15.4 | 10.4 | 71.5 | 40.2 |
| 450° C. | 11.5 | 17.9 | 13.5 | 72.3 | 41.2 |
| 500° | 14.3 | 20.3 | 16.3 | 74.0 | 43.7 |
| 550° C. | 17.2 | 22.5 | 18.7 | 76.1 | 47.4 |
| 600° C. | 20.8 | 28.8 | 24.7 | 79.1 | 51.8 |

*Mel stands for melamine and DCDA stands for dicyandiamide

We claim:

1. Ammonium polyphosphate adapted to undergo decomposition at an increased rate at temperatures within the range 300° to 600° C., the ammonium polyphosphate having been obtained by subjecting a long chain ammonium polyphosphate with a mean chain length of 100 to 1000 and melamine or dicyandiamide or mixtures or derivatives thereof to tempering treatment with intensive agitation at 100° to 200° C. over a period of 10 minutes to 2 hours.

2. Ammonium polyphosphate as claimed in claim 1, the long chain ammonium polyphosphate having been admixed, prior to the tempering treatment, with 1 to 5 weight % of melamine or dicyandiamide or mixtures or derivatives thereof.

3. A coating composition containing the product of claim 1 as a flame-retardant agent.

4. A process for improving the 300°–600° C. decomposition rate of an ammonium polyphosphate, said ammonium polyphosphate having a mean chain length of about 100 to 1000 and being a compound of the formula $$H_{(n-m)}(NH_4)_m P_n O_{3n+1}$$

in which m/n is at least about 0.7 but m is less than n+2, so that a minor amount of acid groups, relative to the amount of NH₄ groups, are available, said process comprising:

reacting a minor amount of melamine or dicyandiamide or their derivatives which are thermally stable up to a temperature of about 220° C., or mixtures thereof, with said ammonium polyphosphate, whereby the melamine or dicyandiamide or derivative thereof becomes superficially fixed to acid groups on the surface of said ammonium polyphosphate, thereby obtaining a reaction product with said improved decomposition rate but essentially without apparent increase in the water soluble proportion of said reaction product, said reaction being effected with continuous thorough mixing at a temperature of about 100° to 200° C. and over a period of about 10 minutes to 2 hours, and cooling the resulting reaction product.

5. The reaction product made by the process of claim 4.

* * * * *